United States Patent
Van De Kerkhof et al.

(10) Patent No.: US 11,151,962 B2
(45) Date of Patent: Oct. 19, 2021

(54) GRAPHICS-SAFE HDR IMAGE LUMINANCE RE-GRADING

(71) Applicant: KONINKLIJKE PHILIPS N.V., Eindhoven (NL)

(72) Inventors: Leon Maria Van De Kerkhof, Eindhoven (NL); Wiebe De Haan, Eindhoven (NL); Johan Cornelis Talstra, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 16/642,958

(22) PCT Filed: Sep. 4, 2018

(86) PCT No.: PCT/EP2018/073715
§ 371 (c)(1),
(2) Date: Feb. 28, 2020

(87) PCT Pub. No.: WO2019/048420
PCT Pub. Date: Mar. 14, 2019

(65) Prior Publication Data
US 2020/0193935 A1    Jun. 18, 2020

(30) Foreign Application Priority Data

Sep. 5, 2017 (EP) ..................................... 17189493

(51) Int. Cl.
*G09G 5/02* (2006.01)
*H04N 21/43* (2011.01)
(Continued)

(52) U.S. Cl.
CPC ..... *G09G 5/026* (2013.01); *G09G 2320/0666* (2013.01)

(58) Field of Classification Search
CPC combination set(s) only.
See application file for complete search history.

(56) References Cited

U.S. PATENT DOCUMENTS

| 10,567,826 B2 | 2/2020 | De Haan et al. |
| 2015/0117791 A1* | 4/2015 | Mertens ............... H04N 19/625 382/239 |

(Continued)

OTHER PUBLICATIONS

International Search Report and Written Opinion from PCT/EP2018/073715 dated Dec. 7, 2018.

*Primary Examiner* — Wesner Sajous

(57) ABSTRACT

To allow pragmatic insertion of secondary images by an apparatus connected to the final display we invented an image processing apparatus (301, 501) with an output image connection (506) for connection to a display (550), and an input (510) for receiving an input image (IM) and metadata specifying at least one luminance mapping function (F_Lt), which luminance mapping function specifies the relationship between luminances in the input image and a second image with an at least 6 times higher or lower maximum luminance, and comprising a graphics generation unit (502) arranged to determine a secondary image (IMG), and an image composition unit (504) arranged to compose an output image (IMC) on the basis of the pixel colors of the input image and of the secondary image, characterized in that the image processing apparatus comprises a luminance function selection unit (505), which is arranged to output to a metadata output (507) a copy of the at least one luminance mapping function (F_Lt) in case no secondary image colors are mixed with the input image, and which is arranged to output a predetermined mapping function (F3) in case the output image is not identical to the input image because some pixel colors of the secondary image have been used to change the input image colors.

13 Claims, 6 Drawing Sheets

(51) Int. Cl.
*H04N 21/84* (2011.01)
*H04N 9/77* (2006.01)
*H04N 19/46* (2014.01)

(56) References Cited

U.S. PATENT DOCUMENTS

| | | | |
|---|---|---|---|
| 2015/0156469 A1 | 6/2015 | Qu et al. | |
| 2017/0330529 A1* | 11/2017 | Van Mourik | ........ G09G 3/2003 |
| 2018/0018932 A1* | 1/2018 | Atkins | ............... H04N 5/44504 |
| 2018/0025477 A1* | 1/2018 | Min | ..................... H04N 1/6027 |
| | | | 345/590 |
| 2018/0278985 A1* | 9/2018 | De Haan | .............. H04N 21/845 |
| 2018/0336669 A1* | 11/2018 | Mertens | ................... H04N 5/57 |
| 2019/0052908 A1* | 2/2019 | Mertens | ................... G09G 5/02 |
| 2019/0311694 A1* | 10/2019 | Van Mourik | ...... H04N 21/4854 |

* cited by examiner

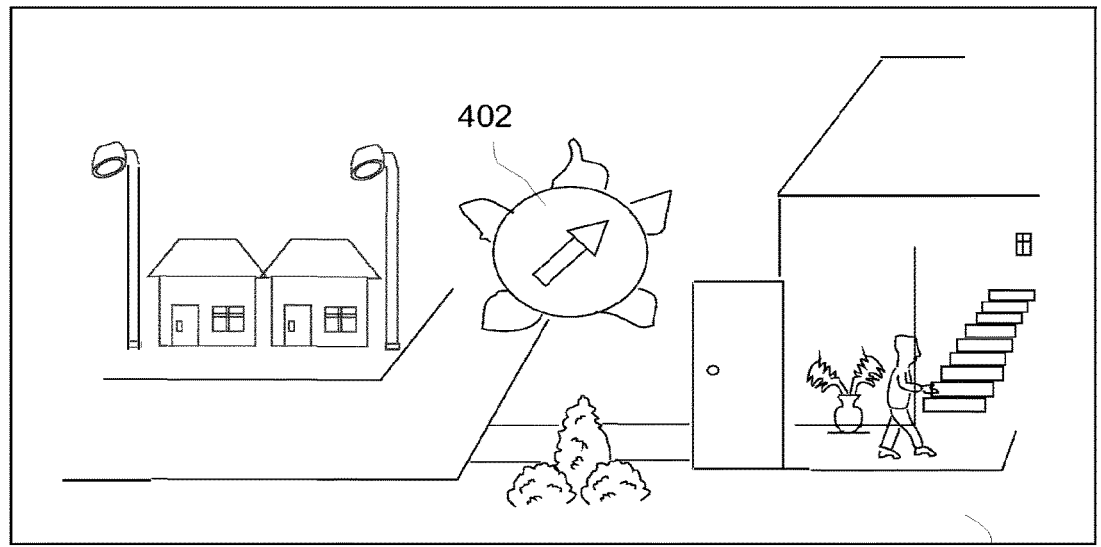
Fig. 4A
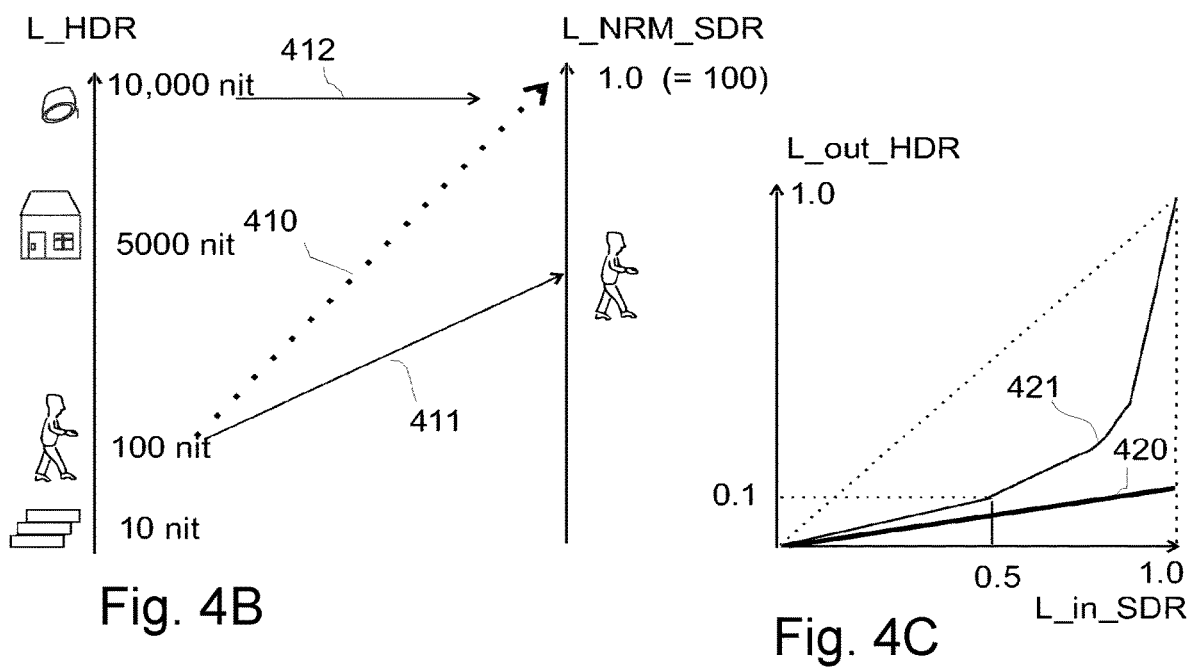
Fig. 4B
Fig. 4C

GRAPHICS-SAFE HDR IMAGE LUMINANCE RE-GRADING

CROSS-REFERENCE TO PRIOR APPLICATIONS

This application is the U.S. National Phase application under 35 U.S.C. § 371 of International Application No. PCT/EP2018/073715, filed on Sep. 4, 2018, which claims the benefit of EP Patent Application No. EP 17189493.4, filed on Sep. 5, 2017. These applications are hereby incorporated by reference herein.

FIELD OF THE INVENTION

The invention relates to methods and apparatuses for handling pixel colors which need to be adjusted in luminance from a first situation to a second situation, the first situation e.g. typically being an original coding of a HDR image, and the second situation e.g. typically being the optimalisation of that image for presentation on a display with a dynamic range, in particular a display peak brightness PB_D, which is different from the peak brightness a.k.a. maximum luminance present in the coded HDR image (PB_C).

BACKGROUND OF THE INVENTION

Until a couple of years ago, all video and most still images were encoded according to the so-called low dynamic range (LDR) philosophy, also called standard dynamic range (SDR). That meant, whatever the captured original scene was, that the maximum of the code (typically the 8 bit luma Y'=255, and similar for the non-linear approximately square root R'G'B' color components) should by standardized definition correspond to, i.e. be rendered on, a display with a display peak brightness PB_D (i.e. the brightest white color which that display can render) being by standard agreement 100 nit. This was done because all displays were actually almost identical as regards their colorimetric capabilities, i.e. they could (only) render luminances between 0.1 and 100 nit, and that is what one had to make do with to make the colors of any image which was desired. Still, to the users of the system, for decades it seemed like any image that could occur or was desired could reasonably convincingly and with sufficient colorimetric or visual quality be displayed. But also, it made things simple, since one had a clear single color gamut in which one could define reasonably looking images and their colors, for any scene, even originally HDR scenes like a cave, e.g. by brightening the cave interior, and typically clipping the outside world pixels to white, or bright pastel colors.

Such displays could render quite nice images, and consumers don't complain about the image quality, in particular because the reflectances of natural objects range about between 95% and 0.5%, so if only during content production one took care of the illumination of the scene by making it reasonably uniform, the end viewer would indeed see at least all objects nicely, with naturalistic colors and relative brightness. However, this might be not so evident if a scene which contained either bright light regions or dark shadowy areas had to be rendered naturalistically, in particular so that the viewer gets a realistic impression of the different lighting regimes throughout the scene.

The expected, and currently realized, emergence of High Dynamic Range (HDR) displays which are capable of rendering far brighter pixels (typically for a good quality HDR display 10× brighter, but with high end HDR displays even 100× brighter), required also a new technology for the coding and handling of such HDR images, i.e. images which may contain quite brighter regions than the 100 nit SDR white (e.g. a bright city illumination lamp rendering of 900 nit), and/or darker regions (OLEDs under the right viewing environment should go as dark as +−1/1000$^{th}$ nit). Also the dynamic range of cameras has become increasingly better, but for the understanding of the present technology the reader may simply assume that the pixel luminances are generated by a computer, i.e. at will, but of course following the required technical principles, e.g. the specifics of a specific HDR video codec. The reader understands that in practice HDR video can be used in various areas of technology, from consumer television to security, etc.

In this text it is assumed that when a HDR image or video is mentioned, it has a corresponding coding peak brightness PB_C or maximum luminance for the highest luma code (or equivalently highest R', G', B' values in case of an RGB coding instead of an YCbCr encoding) which is higher than the SDR PB value of 100 nit, and typically at least 6× higher. Ergo, there can be image pixel color information encoded in the HDR image coding of such bright pixel luminances (e.g. 1000 nit instead of limited to 100 nit as in SDR image/video coding), even though the manner in which the encoding happens can be manifold. Correspondingly, the to be rendered maximum display luminance for having the HDR image look optimal may be e.g. 1000 nit, 5000 nit, or 10000 nit. Note that this should not be confused with the prima facie complex concept which will be detailed below, that one can encode such a HDR image or video actually as some SDR image or video to be communicated to receivers, in which case that SDR image is directly renderable on a 100 nit display, but importantly, such communicated SDR image also contains all information—when co-communicating corresponding associated metadata which encodes a luminance transformation for recovering the HDR image luminance from the SDR image pixel luminances—for creating a HDR image with a PB_C of e.g. 1000 nit, and hence such bright HDR pixel luminances (although not directly coded solely as SDR lumas).

Once having made the move to HDR video coding, e.g. in a typical television delivery chain, or a typical television signal handling apparatus, such as e.g. a BD player or Settopbox (STB), one finds one must re-develop much of the commonly existing technology, and reformulate and even often re-invent common SDR era technical beliefs.

So a high dynamic range coding of a high dynamic range master image is capable of encoding images with to be displayed luminances of e.g. up to 1000 nit (or more in other HDR image codings), to be able to display good quality HDR images, with e.g. bright explosions compared to the surrounding displayed scene, or really sunny looking holiday pictures, etc.

In practice, there are scenes in the world which can have very high dynamic range as measurable with a luminance meter (e.g. an indoors capturing with objects as dark as 1 nit or less, whilst simultaneously seeing through the window outside sunlit objects with luminances above 10,000 nit, giving a >=10000:1 dynamic range, which is 10× larger than a 1000:1 dynamic range (DR), and even 100 times larger than a 100:1 dynamic range; and e.g. TV viewing may have a DR of less than 30:1 in some typical situations, e.g. daylight viewing).

Since displays are becoming ever better (a couple of times brighter PB_D than 100 nit, with 1000 nit currently being purchasable since approximately one year as a television and from this year even a monitor, and several thousands of nits PB_D being envisaged and already appearing), a goal is to be able to correspondingly render images of various HDR scenes increasingly beautifully, and although not exactly identical to the original because of such factors like different viewing conditions, at least very natural, or at least pleasing. And this needs what was missing in the SDR video coding era: a good pragmatic HDR video coding technology to encode how to render those images. But also in addition to these good handling methods for the coded images, e.g. novel optimal display methods, the coding should also fulfill as much as possible the many practical needs of the various players in the market, such as cable TV providers, IC makers, content creators, etc.

The reader should also understand that because a viewer is typically watching the content in a different situation (e.g. sitting in a weakly lit living room at night, or in a dark home or cinema theatre, instead of actually standing in the captured bright African landscape, so a bright object could quickly appear too bright in a darker viewing situation), there is no identity between the luminances in the scene and those finally rendered on the TV (or other display). There is even no identity between the relative or normalized luminances, i.e. all the scene luminances divided by some maximum scene luminance, versus (also on 0-1.0 scale) the display-rendered luminances divided by PB_D. Hence for the present discussion the reader may start his studying by ignoring the original scene as it was present during camera capturing, and just focus on the image as it should be displayed (e.g. on a high quality reference display e.g. of 5000 nit PB_D, as the representation of what the actual HDR image is). This forming of a final HDR image to be displayed corresponding to the original scene luminances and brightness impressions can be handled inter alia by having a human color grader manually decide about the optimal colors on the available coding dynamic range C_DR, i.e. of the associated reference display (e.g. PB_D=5000 nit), e.g. by prescribing that the sun in the scene should be rendered in the image at 5000 nit (rather than its actual value of 1 billion nit, which cannot be rendered on any display).

This is called a HDR master grading of the content (and the resulting image is the master HDR image, or grading), and obviously how it is actually performed may again depend on various practical factors, such as e.g. whether the content is created as a live stream from a happening which is being broadcasted, etc. E.g. alternative to human intervention and as far as this application's aspects are concerned, automatic algorithms may do such a conversion from e.g. a raw camera capturing to what in the text will be (generically) called a (master) HDR grading. This means one can then (directly, without further colorimetric optimization, because corresponding with said 5000 nit display it is hence also optimal when rendered on such a 5000 nit display) display this master grading on a 5000 nit PB_D HDR display, at those locations where it is available. Automatic luminance determinations will often occur somewhere in the technical handling chain of the HDR video communication, from initial creator, to ultimate consumer.

At the same time however, there will for the coming years be a large installed base of people having a legacy SDR display of 100 nit PB_D, or at least some display which cannot make 5000 nit white, e.g. because it is portable (e.g. with a dynamic range with a display peak brightness PB_D=500 nit e.g.), and those people need to be able to somehow see the HDR movie too, and ideally as optimally as possible (i.e. typically with all object brightnesses appearing reasonably close to what they were in the HDR master, so that at least e.g. the atmosphere or mood of the image is maintained). So there needs to be some mechanism to convert from a 5000 nit PB_C HDR image to a 100 nit SDR look image of the same scene.

For convenience for the reader and to get him up to speed quickly on some of the aspects involved, FIG. 1 shows a couple of archetypical illustrative examples of the many possible HDR scenes a HDR system of the future (e.g. connected to a 1000 nit PB_D display) may need to be able to correctly handle, i.e. by rendering the appropriate luminances for all objects/pixels in the image. E.g. ImSCN1 is a sunny outdoors image from a western movie (which has mostly bright areas, which should ideally be rendered somewhat brighter than on a 100 nit display, to offer more a sunny look than a rainy day look), whereas ImSCN2 is a nighttime image.

What makes such an image sunny, versus the other one dark? Not necessarily the relative luminances, at least not in the SDR paradigm. What makes HDR image rendering different from how it always was in the SDR era which ended only a couple of years ago, is that the SDR had such a limited dynamic range (about PB=100 nit, and black level approximately 0.1 to 1 nit), that mostly only the intrinsic reflectivities of the objects could be shown in SDR (which would fall between 90% for good white and 1% for good black). That would be good for recognizing objects (having a certain amount of brightness from their reflection, and of course their chromaticity), under uniform technically controlled illumination, but not so much the beautiful variations in illumination itself one can have in natural scenes, and what impact that can have on viewers. One could make the nighttime image somewhat darker, in the luma histogram, but not too much or it would just render as too dark and ugly an image, and on a 100 nit TV or in a 100 nit encoding there just isn't any room available for anything overly bright. So one had to show the objects independent of their illumination, and couldn't at the same time faithfully show all the sometimes highly contrasty illuminations of the scene that could happen. In practice that meant that the highly bright sunny scene had to be rendered with approximately the same display luminances (0-100 nit) as a dull rainy day scene. And even the night time scenes could not be rendered too dark, or the viewer would not be able to well-discriminate the darkest parts of the image, so again those night time brightnesses would be rendered spanning the range between 0 and 100 nit. A conventional solution to that was to color the night scenes blue, so that the viewer would understand he was not looking at a daytime scene. Now of course in real life human vision would also adapt to the available amount of light, but not that much (most people in real life do recognize that it's getting dark, or that they are in a darker, or quite bright environment). So one would like to render the images with all the spectacular local and also temporal lighting effects that one can artistically design in it, to get much more realistic rendered images at least if one has a HDR display available. What exactly would be an appropriate luminance for say a light saber in a dark room we will leave to the color grader creating the master grading(s) to decide (or the shader in broadcasting, or color processing automatic algorithm, etc.), and this application will focus on the needed technical possibilities to create and handle such images.

On the left axis of FIG. 1 are object luminances as one would like to see them in a 5000 nit PB master HDR grading, for a 5000 nit PB_D display (i.e. the grader makes an image assuming the typical high quality HDR TV at home will have 5000 nit PB_D, and he may actually be sitting in a representation of such a home viewing room and grade on such a grading display). If one wants to convey not just an illusion, but a real sense of the cowboy being in a bright sunlit environment, one must specify and render those pixel luminances sufficiently bright (though also not annoyingly too bright, which is a typical pitfall of HDR image creation and handling), around e.g. 500 nit. For the night scene one wants mostly dark luminances, but the main character on the motorcycle should be well-recognizable i.e. not too dark (e.g. around 5 nit), and at the same time there can be pixels of quite high luminance, e.g. of the street lights, e.g. around 3000 nit on a 5000 nit display, or around the peak brightness on any HDR display (e.g. 1000 nit). The third example ImSCN3 shows what is now also possible on HDR displays: one can simultaneously render both very bright and very dark pixels. It shows a dark cave, with a small opening through which one can see the sunny outside. For this scene one may want to make the sunlit objects like the tree somewhat less bright than in a scene which wants to render the impression of a bright sunny landscape, e.g. around 400 nit, which should be more coordinated with the essentially dark character of the inside of the cave. A color grader may want to optimally coordinate the luminances of all objects (already in the PB_HDR=5000 nit master HDR image), so that nothing looks inappropriately dark or bright and the contrast are good, e.g. the person standing in the dark in this cave may be coded in the master HDR graded image around 0.05 nit (assuming HDR renderings will not only be able to render bright highlights, but also dark regions).

Now secondly, one may oftentimes need to have a SDR re-graded image for the HDR image, which simplistically one could summarize as follows: whereas on HDR displays which have the capability (or images coded therefore, as a HDR image of e.g. PB_C=5000 nit) one may spread the object luminances all far apart along the large luminance range, to optimally looking luminance positions, on the SDR luminance range one needs to squeeze them together to fit along the smaller luminance range. Still, preferably in such a manner that the SDR image still conveys as much a possible the HDR look, which is why we assume for now that the secondary grading derived from the HDR master grading is also still a master grading made by the color grader, the SDR master grading. I.e. one needs to apply content-dependent optimal luminance mapping functions, also currently described as dynamic metadata. The reader can understand that there may be some complexity involved in getting all pixel/object luminances optimal for any secondary image of any dynamic range (in particular peak brightness PB_C) corresponding to a master HDR image, or in general any second image of quite different dynamic range derived from any first image, but for simplicity the reader can assume a simple luminance function is used which, when transforming to a lower dynamic range, relatively brightens the darker pixel luminances (i.e. higher slope than 1.0 which is the diagonal), and squeezes the brighter colors in the upper part of the lower dynamic range image's luminance range, i.e. with a reduced slope (this graph can be formulated on two [0-1.0] normalized luminance axes for the input respectively output image).

All the corresponding SDR image pixel/object luminances are shown on the right SDR luminance range in FIG. 1. Note that in-between the two graded images, one can also calculate other HDR images with a different coding peak brightness PB_C, which one may also call medium dynamic range (MDR) images (e.g. for 800 nit).

It can be understood that it may not always be a trivial task to map all the object luminances for all these very different types of HDR scene to optimal luminances available in the much smaller SDR dynamic range (DR_1) shown on the right of FIG. 1, which is why preferably a human color grader may be involved for determining the color transformation (which comprises at least a luminance transformation, or luma transformation when equivalently performed on the luma codes; the luminance transformation may in practice consist of several functions formulating technically interesting sub-strategies, but for this application the reader may consider it for simplicity of understanding to be a single function L_out_SDR=F_L(L_in_HDR)). However, one can always choose to use automatically determined transformations, e.g. based on analyzing the color properties of the image content such as its luminance histogram, and this may e.g. be a preferred option for simpler kinds of HDR video, or applications where human grading is less preferred e.g. in real-time content production (in this patent application it is assumed that without limitation grading could also involve the quick setting of a few color transformation function parameters, e.g. for the whole production quickly prior to the start of capturing).

Furthermore, just to illustrate some technical video coding possibilities, for elucidation we describe an exemplary HDR video coding system which applicant has designed for HDR image coding and in particular HDR video coding (whereby the reader should understand the invention's principles are applicable to other systems than the exemplary system for explanation also), which video coding system not only can handle the communication (encoding) of merely a single standardized HDR video (e.g. 10 bit perceptual quantizer used as luma code defining EOTF for the encoding), for a typical single kind of display in the field (e.g. images defined with PB_C=1000 nit, under the assumption that every end viewer having a 1000 nit PB_D display), but which can at the same time communicate and handle the videos which have an optimal look/grading for various possible other display types with various other peak brightnesses in the field, in particular the SDR image for a 100 nit PB_D SDR display.

I.e., although in such a HDR video communication system one actually communicates only one type of graded images as transmitted pixelated images, typically though not exclusively in this application SDR images (or alternatively the HDR images, with luminance changing functions for deriving the pixel luminances of images with typically then a lower PB_C), because in our system one also adds in metadata one or more functions defining the HDR image pixel colors and in particular luminances from those SDR images, one has at the same time communicated HDR image looks for the scene also (without actually needing to communicate HDR images, like in dual image communication, or at least a second layer of pixelated HDR image data). And we'd like to emphasize that this is not merely a dual communication of two images, but it brings in a new view of thinking about images and being able to handle images: by communicating the look i.e. the various pixel luminances of two far apart dynamic range images (even though only one of those two is actually communicated to receivers as a pixellized e.g. MPEG-HEVC image), the content creator also communicates his artistic view on how for a particular scene the various scene object pixel luminances in the representative image (the master HDR image) should re-grade luminance-wise (i.e. in fact a bundle of images is communicated, or at least instructions for the receiving side on how to re-grade any desired image for any display of PB_D in correspondence with the look or pixel luminances in the master HDR image). That additional benefit comes however at a price of increased complexity in at least some practical situations.

Encoding only a temporally successive run of HDR images, i.e. with the correct look i.e. image object luminances for a rendering on say a 1000 nit HDR monitor, in e.g. a 10 bit legacy MPEG HEVC or similar video coding technology is not that difficult. One only needs to establish an optimal luma code allocation function a.k.a. OETF (opto-electronic transfer function) for the new type of image with considerably larger dynamic range, namely one which doesn't show banding in the many compared to white relatively dark regions, and then calculate the luma codes for all pixel/object luminances.

Applicant however designed a system which is able to communicate HDR images actually as SDR images (standard dynamic range by which we mean a legacy Rec. 709 OETF-based encoding referred to a 100 nit PB reference display, and often optimally color graded on such a reference display), which then can already immediately be used for rendering the correctly looking SDR look on legacy 100 nit PB_D SDR displays.

This means that a) the relative luminances of all objects are so determined that they will look correct or at least plausible on a 100 nit PB_D display, and b) that the receiver can assume that the lumas for creating such luminances were defined by the Rec. 709 OETF, which is approximately a square root function.

In this manner one can, for each kind of HDR scene in a particular shot of consecutive images each time define the optimal functional relationship (function shape, typically a 1-dimensional function defining an L_out for each possible L_in, e.g. 0.1/100<L_in<100/100) between the HDR image pixel luminances, and the LDR image pixels luminances, so that both the HDR and SDR images recoverable at a receiving side will look their best (e.g. brighten the interior of a cave optimally so that a person in the cave is visible, or optimize the luminance of an outdoors region seen through a window will look still sufficiently punchy, whatever the display DR capability).

Thereto, a set of appropriate reversible color transformation functions F_ct is defined, as is illustrated with FIG. 2. FIG. 2 shows non-limitedly a typical system of the SDR-communicating type, for the purpose of explaining the basic concepts. These functions may be defined by a human color grader, to get a reasonably looking SDR image (Im_LDR) corresponding to the HDR master image MAST_HDR, whilst at the same time ensuring that by using the inverse functions IF_ct the original master HDR (MAST_HDR) image can be reconstructed with sufficient accuracy as a reconstructed HDR image (Im_RHDR), or, automatic analysis algorithms may be used at the content creation side for determining suitable such color transformation functions F_ct. The IF_ct functions can be determined from the forward, HDR-to-SDR mapping F_ct functions as communicated, or, the system may even directly communicate the IF_ct function(s).

The color transformer 202 typically applies the F_ct luminance mapping of the relative luminances of the master HDR image (MAST_HDR) pixels, i.e. normalized so that the maximum luminance is 1.0. For understanding the present invention's concepts in a simple manner, one may for simplicity assume it uses a 4th power luminance mapping function (L_out_SDR=power(L_in_HDR; ¼)) for deriving the normalized SDR output luminances of the pixels of the 100 nit PB_C SDR output image Im_LDR (i.e. the right side of FIG. 1), i.e. that such a function gives a reasonable look for the SDR graded corresponding images to the master HDR image of the scene (reasonable meaning for the particular scene such aspects like that a large percentage of the shadowy areas will not look too dark, lamps and other luminous objects will pop as desired by virtue of them having still a reasonable inter-region contrast with the darker image regions even in the SDR image, at least as far as the SDR luminance dynamic range allows, etc.; for other images other factors may contribute, but such details are not essential nor limiting for elucidating the technical components of the present invention).

Since the receivers must be able to reconstruct the master HDR image from the received corresponding SDR image, or at least a close reconstruction but for some compression-related artefacts, apart from the actual pixelated images also the color mapping functions must enter the video encoder 203. Without limitation, we may assume that the video is compressed with a MPEG HEVC video compressor, and the functions are stored in metadata, e.g. by means of the SEI mechanism or a similar technique.

So after the action of the content creating apparatus 221, from the image communication technology perspective, the video encoder 203 pretends it gets a normal SDR image as input, and more importantly: outputs what is technically a SDR image, following the Rec. 709 standard SDR luma specification. So then the further technology, e.g. a transmission formatter 204 applying all the necessary transformations to format the data to go over some transmission medium 205 (e.g. coding to store on a BD disk, or frequency coding for cable transmission, etc.) can just apply all the typical steps it used to perform in the SDR coding paradigm.

Subsequently the image data travel over some transmission medium 205, e.g. a satellite or cable or internet transmission, e.g. according to ATSC 3.0, or DVB, or whatever video signal communication principle, to one or more receiving side(s).

At any consumer or professional side, a receiver 206, which may be incorporated in various physical apparatuses like, e.g., a set-top box, television or computer, undoes the channel encoding by applying unformatting and channel decoding. Then a video decoder 207 applies e.g. HEVC decoding, to yield a decoded SDR image Im_RLDR, and the color transformation function metadata F_ct. Then a color transformer 208 is arranged to transform the SDR image to an image of any non-SDR dynamic range. E.g. the 5000 nit original master image Im_RHDR may be reconstructed by applying the inverse color transformations IF_ct of the color transformations F_ct used at the encoding side to make the Im_LDR from the MAST_HDR. Or, a display tuning unit 209 may be comprised which transforms the SDR image Im_RLDR to a different dynamic range, e.g. Im3000 nit being optimally graded in case display 210 is a 3000 nit PB display, or a 1500 nit or 1000 nit PB image, etc. This display tuning or display adaptation can in our framework, which is based on the co-communicated luminance mapping function, be elegantly derived, by calculating a display tuning luminance mapping function to be applied to the decoded image, which display tuning luminance mapping function is calculated based on the luminance mapping function as received in F_ct, and the display capabilities of the display which is connected, or needs to be supplied with images.

We have non-limitingly assumed the video decoder and color transformer to be in a single video redetermination apparatus 220. The skilled reader can understand that one can similarly design a topology which communicates e.g. HDR images with PB_C=10,000 nit, and the color transformer makes output HDR images with e.g. PB_C=2500 nit, for a corresponding TV or monitor.

Additional Problems Beyond Basic En/Decoding:

This system would work perfectly if one makes the e.g. SDR images and the SDR-to-HDR_10000 luminance upgrading functions at the content creation side (see e.g. a television broadcaster), and just applies those functions at any receiving side, to decode the HDR_10000 images from the received SDR images (assume typically that the three receiving side decoding processing units 206, 207 and 208 are all comprised in a HDR television). This is perfectly in-line with what a skilled person would typically think of an encoding/decoding framework, namely: the decoder just nicely undoes that what the encoder did, as mathematical color transformation to generate optimal images for communication, according to whatever main desideratum for some technical image communication system. However, in an actual video communication chain, there can be apparatuses in between (and in fact worse, apparatuses may not know much or even anything about the color handling behavior of apparatuses before or after them in order of processing or the hardware-connected video handling system chain), and inconveniently those in-between apparatuses can change the image characteristics, in particular the luminances of at least some pixels of some image(s). The pixel luminances will then not be correct for the luminance mapping functions anymore, or formulated differently, the luminance mapping functions F_ct are suddenly not optimal anymore (possibly far from optimal), for at least some parts of some images at some time instants. And the problem is then: what to do; how to elegantly handle this major issue? This is an issue which can pop-up, and which could be handled in various manners, as we exemplify with the prior art patent applications summarized herebelow. We'd like to emphasize that this problem totally couldn't occur, and hence was pleasantly ignored in the SDR video era, because everybody worked in the stable 0.1-100 nit luminance range framework, and nobody did (quite differently shaped) luminance transformations for representing the images in at least two very different luminance dynamic ranges (the higher dynamic range typically potentially being 100× larger than the SDR dynamic range, which means that quite annoying visual errors could occur, potentially even flickering in time etc.)

WO2016074999A also deals with the problem of inserting graphics into video (which has a corresponding luminance re-grading behavior co-supplied as a luminance mapping function in metadata associated an co-receivable with the video images), when an intermediate apparatus and a final display doing luminance processing are involved which may not fully know what the other apparatus is doing and/or may not fully be able to coordinate the required pixel luminance processing behavior, however the issues are handled in a different manner from what is proposed here.

The fact that there are some graphics insertion pixels (graphics being some secondary image to which the luminance mapping function does not correctly correspond, and typically some simple graphics with a limited set of colors like e.g. logos, maybe inserts of something like an app showing a weather chart, subtitles, etc.) which were inserted by some intermediate apparatus in between the original source of the content (i.e. the apparatus of the content creator or at least the content supplier, such as e.g. a tv broadcaster) and the apparatus finally using the video content, which typically is or comprises a display, is signalled by putting some code in the lower bits of e.g. the RGB color code of the image pixels. The end-apparatus, i.e. the display doing the final processing to obtain the correct looking images for its display peak-brightness, can then try to use a more safe mapping method on the graphics pixels than merely applying the luminance mapping function (55 in FIG. 6, or 1009 in FIG. 10 of WO2016074999A) which was optimal for the video surrounding the graphics object region but wrong for the graphics pixel colors. There are various kinds of graphics insertion in the field of graphics composition, hence a number of variants are taught. They roughly fall in two categories. For mere substitution of a video pixel by a graphics pixel (or re-formulated as opaque blending in such framework, having 100% of graphics and 0% of the video in the mix), it suffices to put a binary code in the lowest bits, indicating that A=0 in case the pixel is an original e.g. SDR video pixel, and A=1 in case it is e.g. a subtitle pixel. The receiving display can then apply the SDR-to-HDR luminance mapping function as received to video pixels, and e.g. decide to render the subtitle pixels at a fixed relative luminance percentage of its peak brightness, e.g. 20% of PB_D=1000 nit. More advanced embodiments cater for the more difficult situations in which video and graphics input pixel colors are blended with certain percentages, and the coding in the lowest bits then communicates some aspect of that blend, e.g. how much % of the video luminance or color was retained in the final blended output, and then receiving displays can take that into account to design more advanced luminance mappings for the graphics regions (e.g. trying to undo the mix, by estimating the splitted graphics and video, or at least create reasonably behaving luminance mappings based on that estimated blend- or split-information). In any case all the variants relate to communicating the original luminance mapping function (55) together with the not yet display-optimized image (e.g. the coded image as received, or at least recoded after graphics insertion, i.e. the final luminances of the pixels still need to be established by the sink of the e.g. HDMI link) to the display, in addition to a novel signal codifying aspects of the graphics mixing situation, to let the display figure out what the best, or at least a better display optimization processing should be. In the below embodiments, the sending side, i.e. the intermediate apparatus takes care of judging a better post-processing approach.

WO2017089146A is a much more advanced system (the below embodiments can even work in simple systems), which handles the generic matching of two different input signals, which may have quite different dynamic range, e.g. a 2000 nit PB_C HDR first image to be harmonized with a 100 nit PB_C SDR image, and the basic techniques needed to be calculated for this, namely a determination of the optimal mixing dynamic range of the mixed image content presentation (which can be quite different from the dynamic ranges of both input images, but also in several situations need not be the final dynamic range of e.g. a display which will show the mixed image), but also a matching of various representative (HDR scene situation summarizing) luminance anchors, and a determination of the final total functions to map the luminances in the various images to be mixed to output luminances on the mixing dynamic range. This is a technology which might be combined at least in some of its aspects with some of the below aspects, but a very different system and technical reasoning.

US20150156469A is a set of HDR teachings which are similar to a certain high-level extent (namely that the combination with graphics is also discussed), but also with many differences. To make sure the reader gets the various points and differences, we have summarized such a HDR approach with FIG. 6A and FIG. 6B. The EDR (their wording for HDR) decoder of US20150156469A is of the scalable type, a.k.a. 2-layer type (base layer data and enhancement layer type), or in fact two-image-per-image type. The last point means, that unlike our typical embodiments which would communicate only 1 image per video time instant, US20150156469A would need to send two images per time instant. It is not even the HDR master grading and the SDR grading per se (as one could ask "why not just send those two images then?"), but images derived therefrom, which would normally be able to code both gradings anyway, and probably with less bits (although the two image variant does need more data over the communication channel, and also more complexity, which would become especially interesting in case display tuning is needed).

To be sure that different technical components (and tasks) are fully understood, one must first look at FIG. 6A of the current patent application.

This clearly shows that a HDR video handling processing chain (or apparatus construction) may involve more than what the skilled person would typically consider coding and decoding (at least coming from an LDR era framework and vision). Decoder 601 (residing in some HDR video signal receiving apparatus) generates in this (mere) example an, e.g., 1000 nit HDR image (Im_REF_H, which will be the starting point for further display optimization) from a received LDR image (BL_LDR). Hence, it will typically apply a rather steep luminance mapping function, which mainly boosts the brighter pixels of the input image BL_LDR as shown. After this decoding to the reference image situation (which typically is a reconstruction of the master HDR image which was created at the creation or transmission side) an optimization of that image, i.e. all its pixel luminances, to the dynamic range capabilities of the connected display must happen by a display adaptation unit 602, prior to sending the final, display adapted image Im_DA to the connected display 603. If that display has a PB_D of 800 nit, one should make an image with a maximum coded peak brightness of PB_C=800 nit. Since this is quite close to the 1000 nit of the 1000 nit intermediate reference image Im_REF_H, one could in this example in principle skip the display adaptation and just render the 1000 nit image (whereby the max. image luminance PB_C is mapped to the display's maximum displayable luminance PB_D, i.e., what should be displayed as a brighter 1000 nit pixel becomes a dimmer 800 nit pixel), taking the luminance errors for life, but if one wants to do things correctly some slightly luminance-correction luminance mapping curve should be applied as shown in the rectangle of 602.

This global aspect is similar to our below approach on high level, although the display adaptation may be quite different, and of course also the video decoding, as will be explained by the exploded view of the prior art scalable HDR decoder in FIG. 6B. The equivalent of our display adaptation (DA) in US20150156469A is the display mapping (DM) metadata. This is a more general information about the situation which should guide the display optimization, such as a generic gamut mapping typically based on such aspects as color space or gamut information.

The signal S_HDR consists of 4 types of data (maybe three in simplified versions, but we explain the generics): a first, base layer image (BL_LDR), which will be the LDR image directly displayable on legacy 100 nit SDR displays (called VES1 in US20150156469A; a second enhancement layer image (Im2_ENH; VES2) being decoded by a separate e.g. AVC video decoder 120; metadata relating to the first image (MET(F_L2ImP)), which may typically in some embodiments be a luminance mapping function for predicting an intermediate image ImP; and metadata relating to the second, enhancement image (MET(DecEnh)).

What is exactly in the images and the metadata depends on the scalable HDR coding variant used, because there are several variants (usually minor variants on the multiplicative versus the additive variant).

The older one was the multiplicative variant, and it was based on the fact that on the one hand the first HDR displays consisted of a locally modulatable 2D backlight (i.e. one could either dim or boost the various LEDs lying behind and illumination a small region of LCD pixels) illuminating an LCD panel, the pixels of which function as valves letting through a certain percentage of the local light. For a fixed backlight, an old LCD panel would let through e.g. 0.5%-100% of the light, which would give only a 200:1 displayable dynamic range. If one could for dark regions of the image lower the 0.5% light output to e.g. 0.05% light by dimming the LED light behind those pixels by a factor 10, and on the other hand boost the LEDs behind the brighter image object regions by 10× (which means that the LCD pixels can still only let through at most 100% of the light, but now 100% of locally 10× more light), then one could already achieve on the one hand a nicer DR of 20,000:1, and on the other hand a PB_D of 1000 nit (because that is the luminance that can now be generated for the brightest image region pixels) instead of the usual 100 nit. So, coupling this on the other hand to a more generic observation that also in the real world one can model the luminance emanating from object spots as a variable incoming illuminance x an object reflectance in the order of 0.5%-99%, one could imagine if this is what is needed to generate "arbitrarily, more realistically lit" object pixels on displays, one can drive them with a coding which for each pixel consists of L_displayed[x,y]= L_LDR[x,y]×I[x,y], in which L stands for luminance, and x and y are the spatial coordinates of a pixel (collocated in the output image to be displayed, i.e. the decoded image, and the two input images constituting the dual image HDR encoding: L_LDR being the base image used to drive the LCD pixel transmission percentages, and I[x,y] being a backlight illumination image, which specifies by some agreed definition which I-values should correspond to which amount of boosting or dimming of the various backlight LEDs behind position [x,y]). Data compression savings can be made in this coding technique, because not only the eye may be less sensitive to the spatial resolution of the varying illumination, but actual HDR displays of that type would have a lower resolution of the LED backlight matrix than the e.g. 2K HD LCD resolution (OLED HDR displays were not really on stage in those days). On the other hand, an example of the second metadata MET(DecEnh) for that HDR codec variant could be that one defined the needed backlight illumination values I via a logarithmic function, and that definition would be needed to be able at the receiving side to determine which percent amounts of LED dimming or boosting would be needed to show a nice HDR image (whether a close reconstruction of the master HDR image, or just some good-looking displayed HDR image corresponding with the LDR image BL_LDR, which the many people with legacy LDR displays at home would see).

The LDR image BL_LDR would in case the video chain starts with e.g. a HDR camera capturing typically be generated by applying to the normalized HDR luminances a downmapping curve which is the inverse one of the one shown in 601.

The other class is the additive 2-image HDR coding class, and seems to be the recently more popular one and the one used in the various embodiments of US20150156469A.

In this case the BL_LDR image is again calculated by the transmitter by applying liberally some (typically convex) HDR-to-LDR luminance mapping function, dynamically adjusted to the particular image or at least shot of consecutive images of a single HDR scene, adjusted to what is needed for such an image to optimally convey the HDR luminances as LDR luminances. The first, base layer metadata would then typically contain some additive prediction luminance mapping function, which will calculate from the LDR input image luminances intermediate prediction image (ImP) luminances, performed by image predictor 610. To that correction unit 611 adds a correction image (VES2), after suitable decoding and potentially pre-processing it. Ergo the two image additive HDR decoder functions as L_HDR[x,y]=F_L2ImP(BL_LDR[x,y])+Im2_ENH[x,y] [Eq. 1].

And to that image they apply (for now still assuming there is no graphics information) a display mapping strategy: L_disp[x,y]=F_DM[L_HDR[x,y]], whereby the display mapping can in principle be many things, e.g. global mapping taking into account only the local value of the input luminance L_HDR at position [x,y], or more complex local mapping techniques which may also tune the final image for display based on the luminanc of objects surrounding the position [x,y], the details of this not being given in US20150156469A. But interestingly such an image-property-based local processing could investigate in the display that there are graphics aspects, and take that into account in its display-end final display mapping strategy, whereas other variants of technology may not be able to do so.

Now, given that basic knowledge of 2-layer HDR encoding, US20150156469A describes what in their philosophy can be done when also having graphics in such a coding situation. They describe this in particular in relation to the question which one of the two connected apparatuses being the digital media player and the display/TV should do which of the various needed processings being: decoding (and the corresponding luminance mapping of 601), display mapping, and graphics mixing, and potentially also in which order.

For that US20150156469A comes with two solution category teachings (FIGS. 2B, 3B and 4 merely teaching a specific embodiment of the latter variant in which the graphics image is communicated in the second image placeholder which should have contained a right-eye view image, but which is now repurposed in a 2D application; which details are irrelevant for the present application).

It is suggested by US20150156469A that part of the decoding (which typically involves the not to be confused MPEG decompression on the one hand, and the colorimetric transformations to get the correct luminances for a final or intermediate image on the other hand) in the media player (i.e. the intermediate apparatus which functions as receiver of the creator's metadata over e.g. a satellite or internet connection, and a supplier of the video to a display over e.g. HDMI, i.e. this receiver being e.g. a settopbox), and part in the display. In fact, in this paragraph sends all the information, i.e. the HDR video image information, the graphics information and the metadata in a suitable form over the e.g. HDMI interface, so in that case there is not really a problem, because the display can at its end decide how to optimally create the final output image. In fact, it will first apply the display mapping strategy to the decoded HDR image, and only thereafter mix the graphics, so not only can it choose how to mix the graphics (e.g. adjust the luminance), but in any case the flickering of the mixed graphics due to the application of dynamically changing luminance mapping can no longer occur, because the dynamic mapping has already been preapplied to determine the optimized video prior to the mixing with graphics. Of course on the other hand in this system there is no guarantee that the display will do the graphics mixing actually as the settopbox or BD player desired (e.g. an internal menu of that player now has to be communicated all the way to the display, for that display to perform another apparatus' interface functionality). Also if everything, including the optimization of the video to the PB_D of the connected display already happens in the video player solely, then there is also no problem, since the TV then simply gets the pre-optimized images and merely functions as a dumb monitor, merely displaying without any further processing.

In version 1 of FIG. 1, they perform in the receiver (e.g. a set-top box) by composer 125 the HDR video decoding according to above Eq. 1. They produce this in a high quality common color space, e.g. 12 bit YCbCr. The output signal 137 over HDMI would comprise blended video and graphics made by blender, and some (presumably static) display management data. The graphics and display management seems to be handled integratedly in component 145. Little or no details are given about unit 145, but in case dynamic processing would still happen in the TV—which may not happen if it already happens in the player, the problem of flicker would still exist (and in any case it is not proposed to be handled in any direction towards our present invention).

The more practical solution is proposed in FIG. 2A (at least the coming years it may be assumed that expensive TVs have the more powerful HDR processing capabilities, and cheaper players would probably do some initial management like channel tuning, but leave all the complex HDR calculations to the TV, merely passing all needed data to it; but then if the TV does all processing, the problem of discoordination will again not exist). It is indeed taught that all data is merely interleaved, both the two images per time instant allowing to decoder the EDR a.k.a. HDR image, and the graphics images, which (if not communicated via the 3D video trick) are e.g. communicated as temporally interleaved frames of a higher framerate video. Also all metadata is communicated, including the instructions on how to mix the graphics as desired by the player, i.e. the alpha blend metadata. It can then indeed again be seen in FIG. 3A that the TV can choose the correct processing order so that the dynamic flicker problems underlying the present invention's embodiments cannot occur, i.e. the TV will first decode the HDR image in composer 325, then apply the gamut mapping in display management processor 330, and only then do the blending with the graphics in unit 340. We like to note also the difference of their display management which would typically merely be a receiver-side determined gamut mapping based on identified properties of the image, and only some global properties like e.g. the maximum luminance in the received image (which is not the same as the maximum theoretically codeable luminance PB_C, as the reader can probably imagine for scenes of e.g. a dark cave, which would not contain 5000 nit pixels), and not in our derived luminance mapping function manner, which is based on the artistic luminance mapping guidance of the creator. But in any case the processing topologies between the apparatuses is always different, so that the problem of flicker doesn't even exist.

SUMMARY OF THE INVENTION

To enable good operation of the total image handling chain, i.e. reasonable images being displayed at the final display, the inventors invented an image processing apparatus (301 in FIG. 3 and 501 in FIG. 5) that has an output image connection (506) for connection to a display (550), and an input (510) for receiving an input image (IM) and metadata specifying at least one luminance mapping function (F_Lt), which luminance mapping function specifies the relationship between luminances in the input image and a second image with an at least 6 times higher (or lower) maximum luminance, and comprising a graphics generation unit (502) arranged to generate a secondary image (IMG), which may be e.g. a CGI image like e.g. a logo or text, and an image composition unit (504) arranged to compose an output image (IMC) on the basis of the pixel colors of the input image and of the secondary image IMG, characterized in that the image processing apparatus comprises a luminance function selection unit (505), which is arranged to output to a metadata output (507) (in output metadata) a copy of the at least one luminance mapping function (F_Lt) in case no secondary image colors are mixed with the input image, and which is arranged to output in the output metadata a predetermined luminance mapping function (F3) in case the output image is not identical to the input image because some pixel colors of the secondary image have been used to change the input image colors (i.e. for those pixels the colors in the output image IMG are different from, and typically not trivially related to, the corresponding same position pixel colors in the input image or its decoding IMD).

Such an apparatus would in the image processing chain or system be an intermediate image processing apparatus (e.g. a BD player, or set-top box, etc.) residing in between the input stream of images from the content creating side (e.g. a direct TV broadcasting, etc.), and the ultimate display, which display will also do the luminance mapping of the dynamic range conversion a.k.a. re-grading on the received images, e.g. to obtain final images which are optimal for its dynamic range capabilities (i.e. e.g. SDR to 2000 nit PB_C decoded HDR and subsequently to 1500 nit PB_D, or in one step SDR-to-1500HDR). The intermediate apparatus may not exactly know what is in the images (even if in some embodiments higher end displays may have knowledge of the image properties, but lesser HDR TVs also not), nor what will happen luminance processing-wise in the final display, let alone the intentions of the content creator (as encoded in the luminance re-mapping function shapes). So pragmatic solutions are in order.

What the apparatus/STB will know, is that it can in operation change some pixel colors, in particular their luminances (e.g. by replacing a dark street HDR scene image pixel by a white graphics arrow pixel, or by alpha blending that video pixel with the white color etc.), i.e. it knows that fact (of what it did i.e. what happened under its control, e.g. whether the user has pushed the remote control switching on a user interface which starts the image composition of the video image and the secondary image, in this typical example a graphics image (IMG)). The luminance function selection unit (505) then functions as a kind of selection switch: in case no graphics was mixed, no pixel colors will have been changed (i.e. IMC=IMD, where D is optionally the decompressed image (similarly the process can work on images which need not be decoded or decompressed), in case MPEG video compression was involved, otherwise IMC=IM), and then the original luminance mapping function(s) F_Lt of the content creator are fully correct for each pixel of all images, and can simply be passed through to the display (more advanced intermediate apparatuses might calculate their own version of even better functions, and maybe new images with a different pixel luminance distribution, but the principle stays the same). But in case the graphics was mixed, the apparatus 501 can put a predetermined function (F3) in the stream instead, a function it can predetermine itself to be a safe function for the current or a typical graphics insertion situation, or a selection of at least one of a set of functions even determined priorly, e.g. in-factory by the developer of the apparatus (1 or 1 out of N function being loaded from a memory e.g.), or even the content creator may have added to his communicated normal dynamic luminance mapping functions a well-working predetermined fixed luminance mapping function to be used for a typical or not atypical graphics mixing situation (but taking account the luminance distribution specifics of the current HDR scene image), and the STB can then either load and use that creator-side predetermined function and directly output it, or determine its own (final, for communication to the display) adjusted predetermined function from it. So the original content creator may or may not know of this (i.e. he may not specify well-working fallback functions for his movie(s)), but at least the apparatus 501 can chose a smart function, which works well. The degree of smartness can also vary in different embodiments. Simple embodiments may just use a single simple function which works well on graphics in general or at least one archetypical graphics insertion situation (e.g. for white subtitles the apparatus the apparatus may decide to focus more on the final luminance of those subtitles than the luminance mapping behavior of various image pixels of any particular HDR or SDR image; although more advanced versions may tune the function of the fixed predetermined luminance mapping function to be used as long as the graphics are mixed, or at least for a sizeable period of time of mixing, more to the relationship between the graphics and video pixel luminances or colors). E.g., the apparatus may try to follow to some extent the desired luminance mapping behavior as communicated in the dynamic functions, e.g. it may keep the luminance mapping behavior i.e. function shape for the darkest pixels identical or similar to the shape of the originally inputted dynamic luminance mapping function F_Lt, but it may want to be conservative regarding the boosting of brighter pixel luminances, etc. This will typically produce a sub-optimal HDR image to display, i.e. not exactly the master HDR image look, e.g. with somewhat darker highlights e.g. street lamps (e.g. only boosted 4×, i.e. 400 nit instead of 1000 nit), but at least as long as the UI is displayed, the UI will display reasonably looking, and typically also the HDR video is still quite reasonable (and most likely the viewer will focus on the UI, and whilst reading e.g. a comment or menu or information about some video not on the ultimate perfectionism of the HDR image pixel luminances). The shape of the function F3 can be chosen by apparatus 501, so that on average its UI colors will look nice on most typical occurring kinds of HDR image, even, without taking into account the final display (maybe the image becomes somewhat brighter on brighter displays, but which such an approach at least the relationship between the original video pixel luminances and the graphics-modified luminances is reasonably controlled, i.e. how much brighter e.g. the white arrow will be than other typical luminances in an image; i.e. even discounting final displaying and viewer eye adaptation, the relationship between graphics luminances and video luminances in the image's luma code representation only is already important, and can be hence more carefully handled by higher quality embodiments of the apparatus).

In some embodiments the apparatus which outputs a fixed predetermined luminance mapping function, with a shape which is predetermined to give acceptable visual results regardless of the maximum luminance of the display (550) which is connected. So e.g. if subtitles are placed at 90% of some luminance reference level (e.g. a 100% white), than a function shape can be chosen that doesn't boost the highest possible luminances that occur in the video above e.g. 150% or 200%. Some graphics can become quite bright on the high end high PB_D HDR displays, but at least because the eye can see visually the relationship that a significant amount of video pixels are even brighter, the result may be not too objectionable. The predetermined curve could also be communicated in an absolute luminance representation rather than a normalized to 1.0 representation, e.g. a mapping curve which ends at 2000 nit for its brightest pixel (whether video or graphics), and then even 10,000 nit displays would not render large graphics so brightly it might be considered annoying by some viewers.

Other embodiments may output a predetermined luminance mapping function which shape depends on the maximum luminance of the display (550) which is connected. This may be useful for relative representations, whereby the STB first simply polls the peak brightness of the display, and then ends its mapping function for the brightest e.g. input SDR luminance or luma at 100% (i.e. 1.0) for 1000 nit PB_D displays, at 70% for 2000 nit PB_D, 50% for 3000 nit PB_D, etc., or whatever allocation is desirable according to the manufacturer of the intermediate apparatus/STB.

Alternative embodiments of the image processing apparatus (301, 501) may communicate in the output metadata to the display an indicator (FLG), such as a flag or a function type number, indicating that a predetermined mapping function is to be used by a display when connected and receiving the output image (IMC) for converting the output image (IMC) which said connected display receives to an image of a different luminance dynamic range (typically the display-adapted image). This is interesting for smarter displays. Whereas sending a good predetermined function can serve any dumb display, which has no capability beyond merely applying the fixed or dynamic metadata it receivers, i.e. whichever one the apparatus has output, smarter displays may want to do some part of the procedure themselves. By getting only an indication that the safe fixed luminance mapping is needed, for a certain amount of time indicated by consecutive images and their related flags or other similar metadata, the display can then retrieve the fixed function from its own memory (whether the same function is loaded in the apparatus or the display is in principle not a major difference, however differences can occur in case smarter function determination is need, e.g. based on the creator's F_ct or image properties, and also it should be born in mind that the apparatus and display can be made by different manufacturers, so some variants may be better than others, or at least sufficient coordination is in order). Such a synchronization can be useful e.g. if the apparatus and display are made by the same manufacturer, because then the integer (use predetermined function nr. 1, or nr. 2, etc.) can be a communication to the display to select the corresponding function from its memory rather than it being fetched from the apparatus functions memory and then communicated (this still giving the same rough indication of what happened regarding the graphics mixing inside the apparatus, and which function would seem a safe or safer one to apply as luminance re-grading inside the display, visual quality-wise). This is then an equivalent to function communication, by reference. A flag would work e.g. in systems which find a single highly precautious function sufficient, quality-wise.

Some of the apparatus embodiments may work with dumb, pre-existing HDR displays. But there may also be corresponding smarter HDR displays, such as e.g.:

A display (550) comprising a dynamic metadata analyser (551) arranged to read from received output metadata from an image processing apparatus according to any of its taught variants, when such image processing apparatus is connected to an image input (552) of the display, that such image processing apparatus has communicated a predetermined fallback luminance mapping function (F3) instead of a dynamically varying luminance mapping function. If such is indicated by any mechanism, such as e.g. flags, or writing dynamic metadata functions in other placeholders of the received video signal than predetermined fixed functions (i.e. which will keep a fixed shape for a number of consecutive images), e.g. by reserving in the signal standard a code PRED_FL, and then the data for that function, such as 0<[i,j]<1 coordinates of a multilinear representation of the function shape, etc., the display cannot only apply the fixed function, but also knows the situation, and can adjust further behavior (e.g. not doing excessive internal contrast stretching, etc.).

A display (550) which identifies that a first type of metadata (MET_1) which is predefined for communicating a predetermined fallback luminance mapping function is present in the output metadata.

A display (550) which identifies that a second type of metadata (MET_2) which is predefined for communicating time varying luminance mapping functions is not present in the output metadata. This can be the checking of the absence of the original dynamic luminance mapping functions.

A display (550) which identifies that an indicator (FLG) that a predetermined mapping function is to be used by the display for converting the output image (IMC) is present in the output metadata.

These apparatuses also have corresponding methods of operation.

A method of providing a high dynamic range image signal for driving a display comprising receiving an input image (TM) and metadata specifying at least one luminance mapping function (F_Lt), which luminance mapping function specifies the relationship between luminances in the input image and a second image with an at least 6 times higher or lower maximum luminance, and the method comprising a step of generating a secondary image (IMG), and a subsequent step of composing an output image (IMC) on the basis of the pixel colors of the input image and of the secondary image, characterized in that the method comprises a step of selecting a luminance function, which selection step is arranged to output to a metadata output (507) in output metadata a copy of the at least one luminance mapping function (F_Lt) in case no secondary image colors are mixed with the input image, and which is arranged to output in the output metadata a predetermined luminance mapping function (F3) in case the output image is not identical to the input image because some pixel colors of the secondary image have been used to change the input image colors.

The predetermined luminance mapping function will be used by a receiving apparatus, e.g. a display such as a television, to convert the images in the outputted image signal of the method to derive optimized images. This can be e.g. an up-grading of received SDR images (which do contain luminance information of higher dynamic range, in that such image allows a significant amount of luminance stretching to obtain an image which is close to an original HDR representation image of a corresponding HDR scene) by using a function which typically boosts the luminances of the brighter pixels in the input image compared to the darker luminances. But also the function can be used to down-grade from a received HDR image(s), e.g. by receiving a 1000 nit PB_C image and downgrading to obtain image(s) for a 500 nit PB_D display, etc.

A method of receiving an image signal comprising a succession of pixellized images comprising pixels having colors having luminances and at least one luminance mapping function (F_Lt) per image, comprising analyzing whether the luminance mapping function (F_Lt) is dynamically varying for successive images or predetermined and fixed for successive images, by reading from received metadata, which is output metadata from a coupled image processing apparatus as claimed in one of the image processing apparatus embodiments, that such image processing apparatus has communicated a predetermined fallback luminance mapping function (F3) instead of a dynamically varying luminance mapping function. The skilled person can find inspiration from our teachings that in practice this can be communicated/coordinated in various (typically standardized) manners, e.g. some descriptor can identify of which type (dynamic or fixed predetermined) the luminance mapping function is (typically for a number of successive images, but alternatively one can send a function and the corresponding description for each of the successive images, and then this can communicate the situation without actually needing duration information for a particular fixed predetermined function's applicability), or one can reserve different placeholders in the image signal's metadata, e.g. a first section containing the e.g. LUT-defined variable luminance mapping function, and a second placeholder enabling a possibility for communicating predetermined functions according to any of the application's embodiments (ergo in fact communicating the graphics or in general secondary image "modification" situation), etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, but hidden in the interior of an object, or for intangible things such as e.g. selections of objects/regions (and how they may be shown on a display).

In the drawings:

FIG. 4A schematically shows a typical example of a temporally varying luminance mapping, varying for sequentially consecutive shots of video images, corresponding to a change in the luminance characteristics of various HDR scenes in the movie;

FIG. 4B schematically shows an example of luminance mapping desiderata between the HDR luminances L_HDR on the left and the (normalized to 1.0) SDR luminances on the right side axis;

FIG. 4C schematically shows a normalized function specification;

DETAILED DESCRIPTION OF THE EMBODIMENTS

Figure 1:
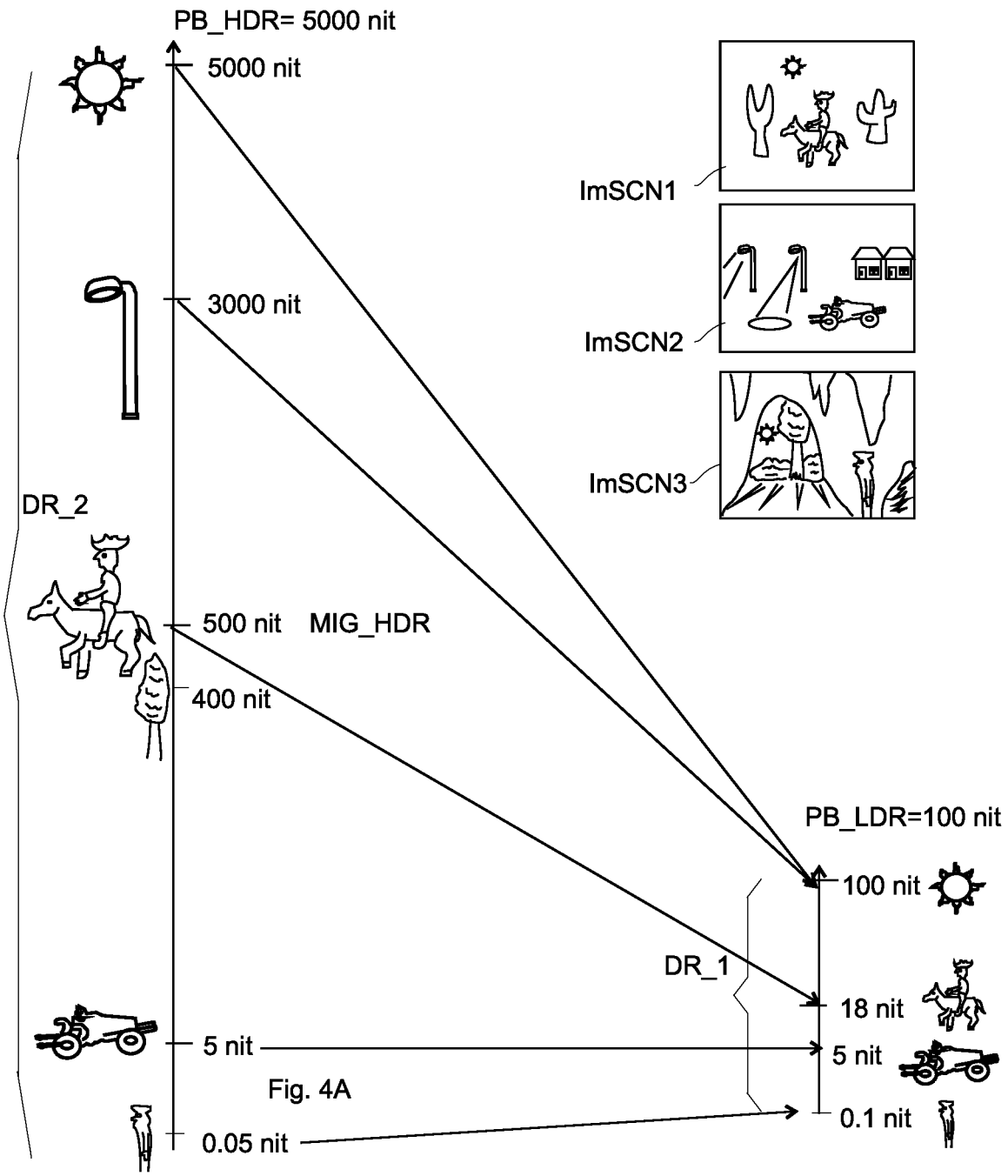
FIG. 1 schematically illustrates a number of typical color transformations which occur when one optimally maps a high dynamic range image to a corresponding optimally color graded and similarly looking (as similar as desired and feasible given the differences in the first and second dynamic ranges DR_1 resp. DR_2) low or more precisely standard dynamic range image, which in case of reversibility would also correspond to a mapping of an SDR image coding the HDR scene, to a reconstructed HDR image of that scene.
Figure 2:
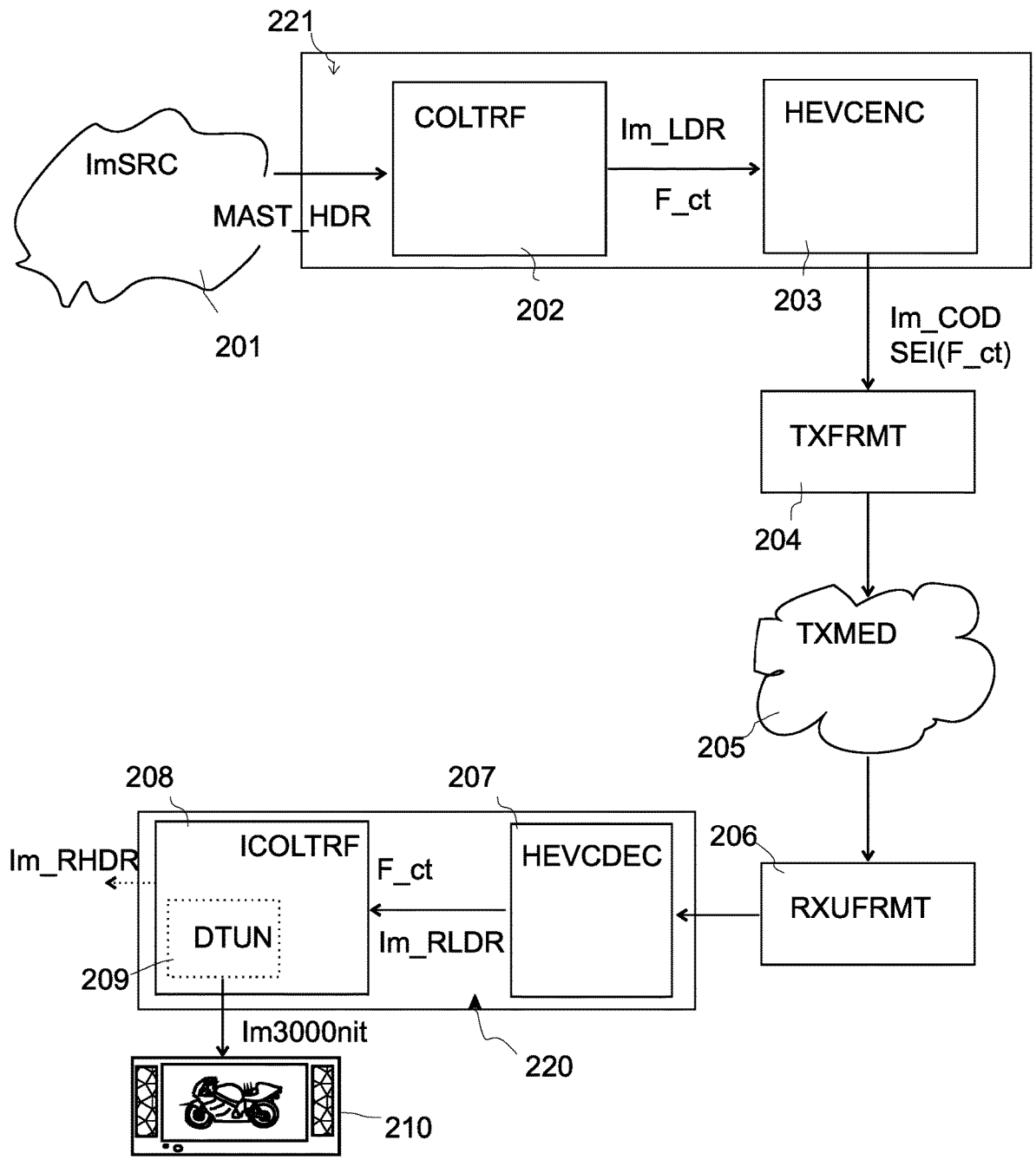
FIG. 2 schematically illustrates an example of a technology to encode high dynamic range images, i.e. images capable of having luminances of at least 700 nit (i.e. at least 7× the PB_C of the SDR image) typically or more (typically 1000 nit or more), which applicant recently developed, which actually communicates the HDR image(s) as an SDR image plus metadata encoding color transformation functions comprising at least an appropriate determined luminance transformation for the pixel colors, to be used by the decoder to convert the received SDR image(s) into HDR images(s) which are a faithful reconstruction of the original master HDR image(s) created at the image creation side.
Figure 3:
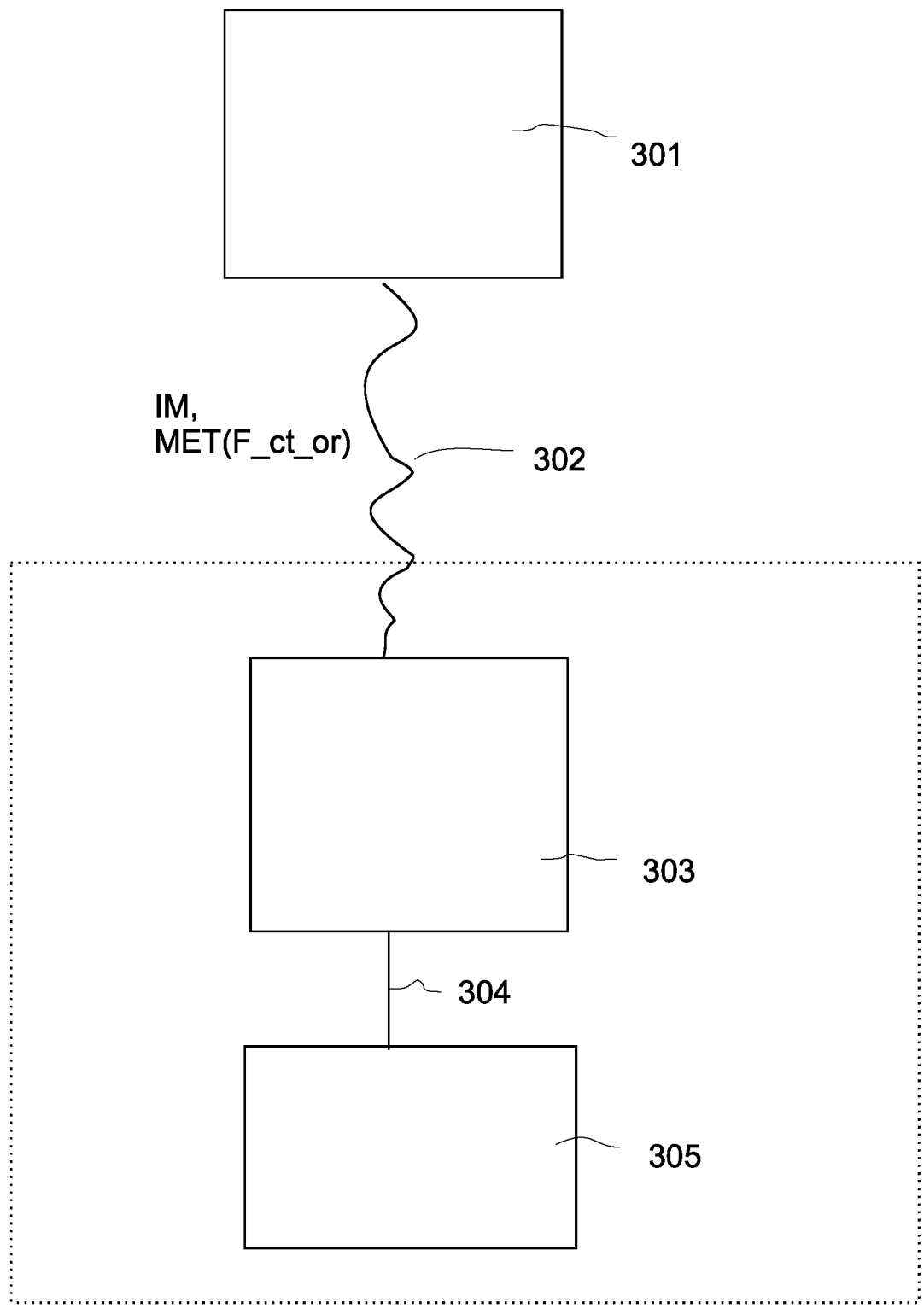
FIG. 3 shows a system in which an intermediate apparatus, capable of image processing to change some pixel luminances, resides between the source of images from the content creator, and the display doing the final luminance mappings to obtain a nice output image on the display.

We elucidate some of the aspects of the present invention with FIG. 3. There is a content creation apparatus 301, which without limitation the reader can assume to be the video apparatus(es) of a television broadcaster in an OB van which creates and communicates video images, or the computer(s) of a computer graphics generation company, etc. The created coded video images IM (i.e. e.g. Rec. 709 encoded SDR images; or alternatively SMPTE 2084 EOTF encoded HDR images, etc.) and the functions F_ct_or ("or" indicating original, since according to function-based HDR image coding this is the function(s) belonging to the pixellized images which are output, to be able to at receiving sites calculate at least one image of different dynamic range) necessary for luminance remapping to obtain an image of different dynamic range (e.g. reconstruction of the original master HDR image in case it is represented by a channel-communicated and received SDR image at a receiving side of e.g. a cable television video communication system). This F_ct_or is the color transformation or in particular luminance mapping function specified by the original content creator (showing how his content should be luminance-adapted to obtain still optimally looking images under very different dynamic range capabilities, e.g. by the receiving side calculating, based on the specific luminance processing directions as encoded in the luminance mapping function shape F_ct_or which was originally created by the content creator as specifying how the corresponding particular HDR scene image should be luminance re-graded to e.g. an 100 nit SDR image, what the lumas or luminances of a corresponding image for rendering on e.g. a 750 nit display peak brightness PB_D are), and it is communicated in metadata, e.g. SEI messages, which are outputted by the content creation apparatus, over a video communication medium 302. We will assume for now this medium to be a portable memory and in particular a blu-ray disk (BD), but the skilled reader can similarly image e.g. a satellite TV connection, or internet connection, etc.

The video as stored on the BD will not be directly input to a display 305 (e.g. a HDR TV), but will be input into an intermediate image processing apparatus 303 which in operation is typically connected to the display, via a second video communication interface 304, e.g. HDMI cable, or wireless connection etc (this poses the interesting additional question that the intermediate apparatus can do some image processing operations, whereas otherwise in a direct supply to a display any operation would happen in that display). In that BD example intermediate image processing apparatus 303 will be a BD player, but the skilled person can understand how the same technologies can similarly be embodied in a STB, or computer, etc. The fact that the intermediate image processing apparatus 303 resides at the same location typically as the display, usually a final viewer house, is symbolically shown with the dotted rectangle.

The problems will now be further elucidated with FIG. 4. We show a typical example of a temporally varying luminance mapping, varying for sequentially consecutive shots of video images, corresponding to a change in the luminance characteristics of various HDR scenes in the movie (for more information than the simple elucidation given in this application, the reader is referred to WO2012035476). Some people might think SDR<>HDR conversion is relatively straightforward, but in this simple example one finds from the luminance mapping function shapes already how versatile dynamic range remapping can be.

In FIG. 4A we see an example of a HDR scene, from which consecutive images will be shown. A person walks from an overview street scene of a nighttime street, into a well-lit house, in which only interior composition frames are shown (what is seen outside through windows can be clipped to black). Or a related issue happens when the person walks from a sunlit middle of the day outdoors situation to a considerably darker, yet still not too dark, indoors.

In FIG. 4B we give some examples of (e.g. artistic decided by the color grader of the content creator) luminance mapping desiderata (i.e. corresponding mapping function shapes) between the HDR luminances L_HDR on the left (assuming a typical HDR10 range up to maximally PB_C=10,000 nit) and the (normalized to 1.0) SDR luminances on the right side axis.

E.g., if the human has white clothes, he can be a good reference luminance object, for the object white (but which luminance will vary when he walks between darker and brighter environments).

In the well-lit indoors shots, one can have a situation which is close to SDR (indeed, if a room is well-lit, an SDR representation usually is known to work quite well, but for maybe some too dark nooks which map to invisible black, or some clipping lamps and the like, ergo, not too problematic color representation and/or display errors in SDR). Ergo, one can have luminances up to the SDR white level, i.e. one could map the white of the person's clothes close to, or for the elucidation exactly to 100 nit. That would be: 100 nit in the communicated SDR images (and in case the illumination is such that also in the HDR image this corresponds to the 100 nit luminance level, the SDR image seems to be a quite good representation of the HDR image, at least for that partial situation of that moment in time).

Formulated the other way around, it may make sense to in such a situation also give the person's white shirt pixels a luminance of +−100 nit in the (reconstructable at the receiving side, or master at the creation side) HDR image, which happens to be the equi-luminance mapping. In the normalized function specification of FIG. 4C (i.e. where the luminance mapping function is defined equivalently between normalized SDR and HDR luminances which can run up to 1.0 maximally), such a behaviour corresponds to a first mapping function 420, which has a (relative) dimming character. E.g., if the PB_C of the HDR image is 1000 nit (i.e. the actual luminance which corresponds to 1.0), then the first mapping function 420 corresponds to a dimming/10 (because 100 nit white shirt is $\frac{1}{10}^{th}$ of the 1000 nit HDR image PB_C) for all possible SDR input luminances (which means there would be nothing in the HDR image above 100 nit, or 0.1, for this example; which may indeed be so if we have a uniformly lit scene of not too high dynamic range represented as a HDR image; in practice there may be some brighter outliers, but the mapping of those may depend on how the SDR image represents them, e.g. clipped). In FIG. 4B the corresponding mapping of the white person clothes is schematically represented with dotted luminance re-allocation arrow 410.

If however the person walks outside, the nighttime street can simultaneously have very darks corners, and highly luminous pixels, e.g. of the street lamps (and objects close to them, like walls). Ergo, one must squeeze this quite higher dynamic range of luminances into still the same quite small 0.1-100 nit SDR range. One will need to dim the relative brightness of the person on the SDR range (arrow 411), to obtain room for the brighter objects, like the street lamp (arrow 412). One typically gets a convex function, which at the decoding side (i.e. the mapping from the received SDR image to the HDR_1000 image) is the inverse function which looks like a strongly increasing concave second luminance mapping function 421 (e.g. defined by linear segments for the darkest and brightest pixels). This is clearly a very differently shaped function, with quite different visual behaviour, although it corresponds to a consecutive shot of images, over time.

From the scene object point of view, the content creator will have optimized those functions, so that the whole movie looks optimal, not just image per image, but also in temporal succession. E.g., as one can see from the seemingly strange low usage of the HDR luminance range for the first function 420, this generates HDR pixel luminances which are similar for when the person is walking outdoors, yet, in the SDR images the person is nicely bright and visible for both the indoors and outdoors images. Such functions can be tuned to give a similar look for the person, a certain amount of dimming or brightening when he moves to a darker or brighter region of the scene, both in the SDR and HDR image, and coordinated, and in principle the relationship can be whatever is needed artistically in the two gradings, by the content creator's ability to specify whatever function shape he needs for each time instant. Ergo, the scene pixels will look "perfect" for this video content.

A problem however happens when the intermediate image processing apparatus 303 starts creating new pixel values, which it could do smartly (e.g. anticipating later typical or actual luminance modification behavior), but oftentimes it does so in a fixed manner, blind to the specific colorimetric aspects of the functional luminance re-gradings (oftentimes the BD players may want to change the SDR images, but merely pass through the functions to the display, to let that display do the needed SDR-to-HDR transformation, or other generation of an image of different dynamic range).

Suppose the BD player superimposes a graphics element 402 which indicates a state of its user interface. Suppose for simplicity it is just a pixel replacement, but things can become more complex if e.g. transparency is involved, e.g. the mixing of alpha times the graphics luminance+(1-alpha) times the underlying HDR scene image luminance, or even temporal effects such as fading etc.

The arrow in the graphics element 402 (i.e. a small image) may typically be given e.g. the color white by the designer of the UI. When that designer of the UI specifies white, he is implicitly thinking of SDR white (i.e. luma 255 displaying as 100 nit, ergo the 1.0 value of a communicated SDR image, i.e. where the person's shirt would be at least in some of the images corresponding to some illumination regions), and he may not even be aware that in HDR image coding or displaying there can be several quite different whites. In case the function 420 is used, things will go well, because the arrow will show as 100 nit on the reconstructed HDR image. However, if for another point in time the F_Lt changes into function 421, then the display will boost all colors which in the SDR image are defined as white, to the peak brightness of the HDR image, i.e. 1000 nit. 1000 nit may be a fair value for corresponding objects in the HDR scene image, like the lamp, but the arrow will start to excessively glow. And more disconcertingly, it will start flickering each time the dynamically changeable luminance mapping function shape changes, becoming seriously brighter or dimmer, with in this example already a factor 10× (and which may not be appropriate for e.g. user interface menus, subtitles, etc., since it doesn't help with easy readability).

Figure 5:
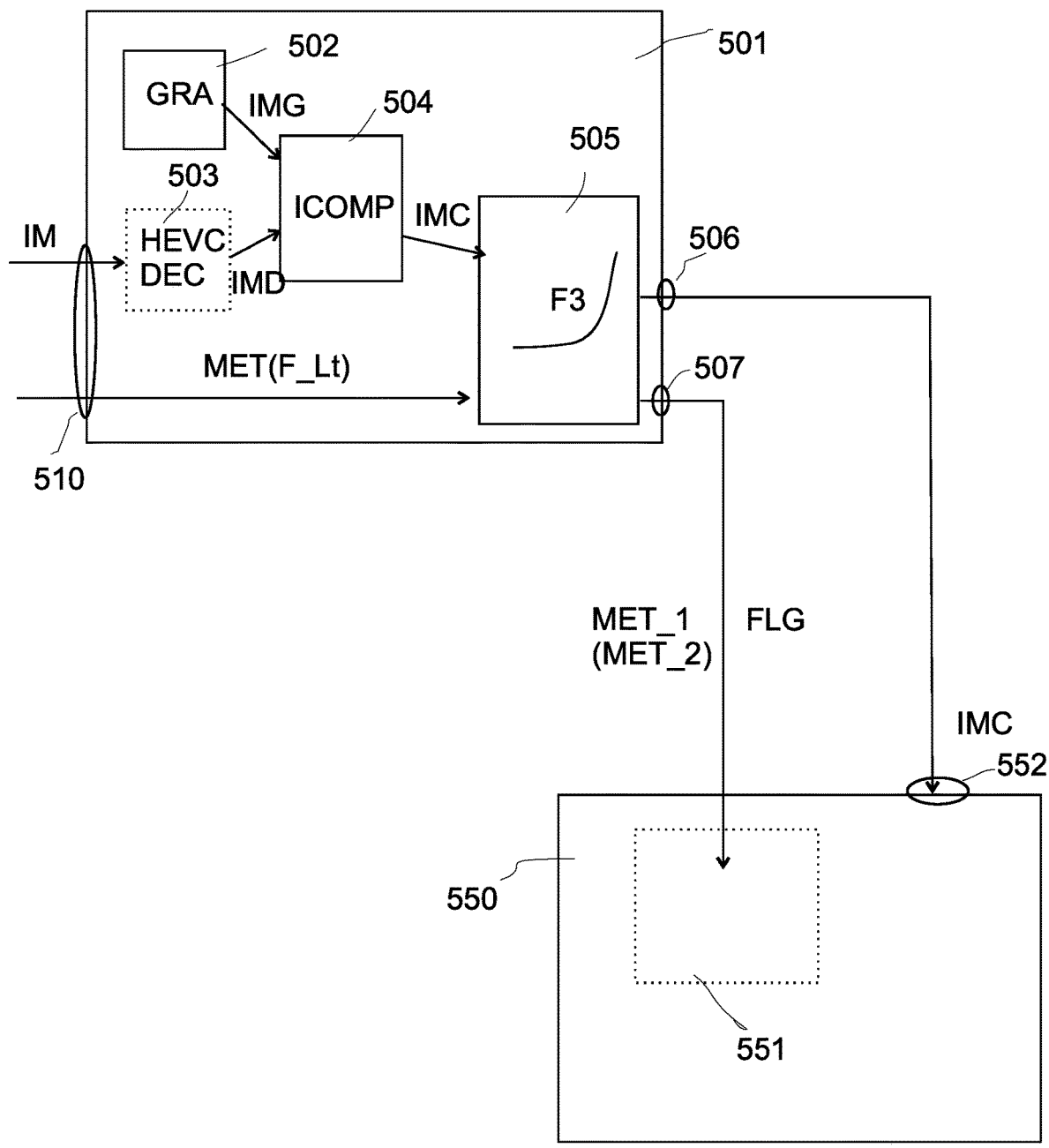
FIG. 5 shows in one overview image some possible technical apparatuses according to the present concepts.
Figure 6A:
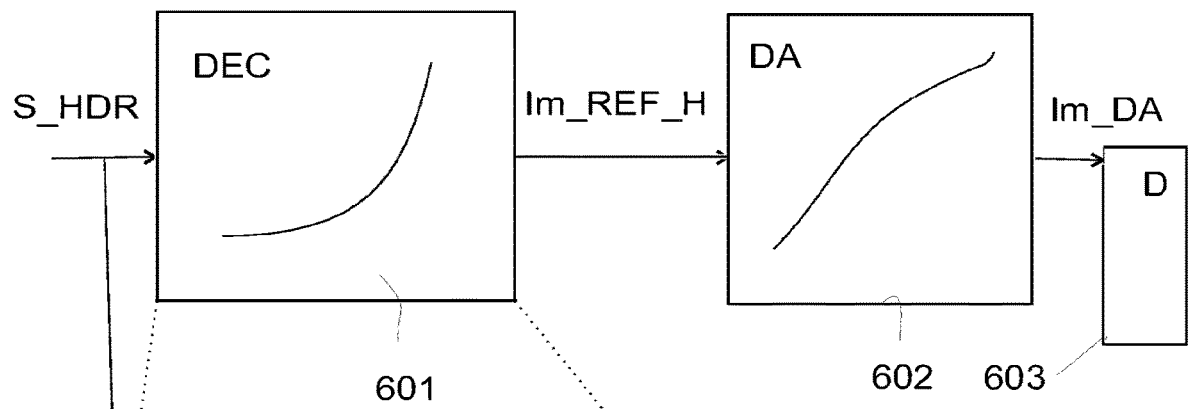
FIG. 6A schematically shows a HDR video handling processing chain.
Figure 6B:
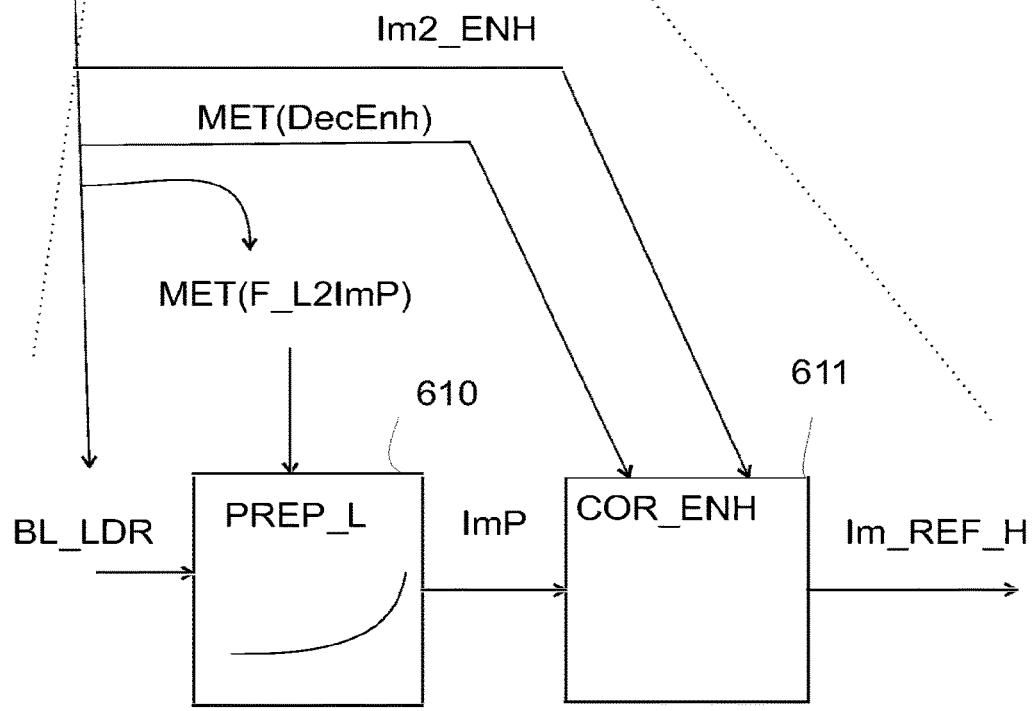
FIG. 6B schematically shows an exploded view of the prior art scalable HDR decoder.

FIG. 5 concisely shows in one total system configuration some possible embodiments of the present inventive concept.

The invention can be realized solely in the intermediate, image pre-processing apparatus (501), in which case a standard e.g. HDR TV can be connected, which is unaware of the fact that something special happened. It will then just apply the new, substituted luminance mapping function F3 (i.e., instead of passing through the, dynamically changing over time, optimally determined luminance mapping function for the present image(s), F_Lt, the apparatus 501 communicates a (fallback) function F3, which though not optimal for the present HDR scene image, sufficiently works in practice; the viewer is probably looking at the menu information, so not so critical about the surrounding video luminances). There will be no good theoretical solution to this problem, because the graphics location can create any kind of luminance, which would need another output luminance for the same input luminance value (inside the graphic) than the output luminance for a similarly valued input luminance of the underlying video where no graphics resides (i.e. that cannot be perfectly realized by a 1D luminance mapping function), e.g. one might want to boost the lamps, but not the white arrow. In fact, one would need to design complex new luminance coordination techniques, like WO2017089146A described in the introduction, but that may not always be feasible, e.g. in apparatus which the manufacturer wants to keep simple. But the apparatus 501 could at least make sure that it communicates (in at least one metadata), a function of which e.g. it is at least guaranteed that the graphics pixels, even when nearly 100% mixed with the underlying video, i.e. e.g. opaque, do not become too bright, and in particular, that this output luminance for graphics pixels does not change in time too much. E.g. when referring to FIG. 4, the display (or apparatus connected to the intermediate apparatus 501 in general) could use a linear function similar to function 420, but three times higher, i.e. mapping 1.0 SDR input luminance (L_in_SDR) to a HDR output luminance L_out_HDR=0.3. This would give already a nicely brightened HDR version of the SDR image. But not with an annoyingly bright graphic element, and especially since this function keeps being used for successive images, not a flickering rendering (the video luminances may change somewhat, but that would be less annoying for this graphics display scenario, and change of the video is natural and expected, only, it is now displayed with a more mitigated HDR look than the theoretically optimal one). A more sophisticated function would have a concave shape like function 421, i.e. brightening mostly the brighter pixels of the image, but then with a maximum which doesn't map to 1.0, but e.g. to 0.3 (at least for a 1000 nit PB_D display).

This function could e.g. have a shape which has two linear segments with a determined point (L_in_SDR_t) where a stronger boosting of the highlights begins. The intermediate apparatus may in some embodiments apply a certain smartness, e.g. when using disk media it could do some lookahead checking which kind of image functions are required for the successive e.g. 2 minutes, and use some averaged function based on that as predetermined function, e.g. trying to keep the darker luminances reasonably rendered (not too bright or dim), and the brighter luminances not too excessively boosted, but also not too dull with little inter-object contrast. Or it may just use a simple function which was predesigned in the labs of the manufacturer, which is known to give a suitable display behavior to all or most graphic on video situations (the function could depend on the type of graphics, e.g. a small logo versus a large window which overlaps with a significant portion of the video).

For functions which depend on the PB_D of the display, the angle of the segments of the darkest pixels can depend on PB_D (and in case it is determined by a pre-agreed algorithm, only a flag indicating that such a function has to be applied to the output image IMC to make a HDR version of it should be communicated to the display, because the display already knows its own PB_D and the pre-agreed algorithm).

In some cases the display may communicate its PB_D value to the apparatus 501 to make a nice fallback function depending on PB_D, and then communicate e.g. the exact shape of this function (which can be done e.g. by encoding a LUT in the metadata, or giving a number of parameters uniquely specifying the function shape).

I.e. the image processing apparatus (301 in FIG. 3 and 501 in FIG. 5) has an output image connection (506) for connection to a display (550), and an input (510) for receiving an input image (IM) and metadata specifying at least one luminance mapping function (F_Lt), but the output connection may also in some embodiments be bidirectional to feedback information from the display (or there may be a second input for that). Typically (though optionally) the input images may come in MPEG compressed (e.g. HEVC) in which case a HEVC decoder 503 will decode them to normal pixel images (IMD), having pixel colors having pixel luminances. In case the input comes from a BD, the luminance mapping functions will have been burned in the BD, and read from it, etc. The output images may in several scenarios be uncompressed, although the principles also work with compressed images being communicated to the display.

The image processing apparatus (301, 501) can output a fixed predetermined luminance mapping function, with a shape which is predetermined to give acceptable results regardless of the maximum luminance of the display (550) which is connected. The functions can be specified in an absolute manner, and indicated to end at e.g. 1000 nit, even for 5000 nit displays.

This could mean that e.g. the contrast of the image is not optimal, but the function could be so designed to e.g. map the darkest pixels so that at least they will be visible (for the example of downgrading a received HDR image to lower dynamic range), or e.g. use an equiluminance approach for the darkest pixels (e.g. up to 0.3 in normalized SDR luminances). The apparatus can without needing to look at the image, make assumptions on what the graphics alone would look like when the display applies its predetermined luminance mapping function F3.

The image processing apparatus (301, 501) can alternatively output a predetermined luminance mapping function which shape depends on the maximum luminance of the display (550) which is connected. This is useful for e.g. maintaining a better darkness of the darkest image areas, and coordinating how bright UI will look on the display, etc.

There are various manners in which the apparatus 501 actually communicates the situation to the display, depending on how one desires to standardize the e.g. HDMI interface. E.g., it can be agreed that simply a luminance mapping function to be applied is communicated (single metadata), and then the display will apply it blindly, and rely on the apparatus 501 to have chosen it safely.

Or one can alternate the communication in two different kinds of metadata, MET_1 for predetermined fallback functions, and MET_2 in case the dynamically changing functions are communicated, and in that case a display can check the situation with its dynamic metadata analyser (551) arranged to recognize a situation that an image supplying apparatus connected to its image input (552) has communicated a predetermined fallback luminance mapping function (F3).

Such a metadata analyser (551) can also see whether an indicator has been filled in indicating that a predetermined fallback luminance mapping function should be used, even if the shape of that function is not communicated but known by the display, because universally pre-agreed (indicated by that indicator, e.g. Fallback_type_1).

I.e. the image processing apparatus (301, 501) as claimed can in addition or alternatively communicate to the display an indicator (FLG), such as a flag or a function type number (e.g. predetermined function shape 1 out of three, suitable for some type of graphics mixing and/or original video luminance distribution), indicating that a predetermined mapping function is to be used by the display for converting the output image (IMC) which it receives to an image of a different luminance dynamic range.

But in addition to intermediate apparatuses serving dumb displays, some aspects of the invention can also lead to more advanced displays, and also embodiments of the intermediate apparatus can be designed to work with such more advanced displays. Such a display (550) may comprise a dynamic metadata analyser (551) which is arranged to recognize a situation that an image supplying apparatus connected to its image input (552) has communicated a predetermined fallback luminance mapping function (F3), e.g. it may identify that a first type of metadata (MET_1) which is predefined for communicating a predetermined fallback luminance mapping function is filled in, or that a second type of metadata (MET_2) which is predefined for communicating time varying luminance mapping functions is not filled in (no optimized metadata, meaning that there will be fallback metadata).

Note that were we teach function for simplicity of understanding, also in some embodiments a set of functions for on image (time instant) can be communicated, which are to be applied concatenatedly, but that doesn't majorly change the essence of our new technology. Luminance is one dimension of the three-dimensional color characterization, so other color processing aspects may be present, and differently in different color representations, but the present invention can be fully elucidated by focusing on the luminance behavior. Whether the apparatus 501 mixes its pixels in a luma or luminance representation is a selectable detail irrelevant to the generic present teaching, but oftentimes the apparatus may send uncompressed video over the connection to the display, e.g. over HDMI. In case the apparatus communicates its fallback situation by communicating no metadata at all, the display may also understand this by applying a fixed predetermined mapping function.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data travelling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. An image processing apparatus, comprising:
an output image connection, wherein the output image connection is arranged to connect to a display;
an input circuit,
wherein the input circuit is arranged to receive an input image and input metadata,
wherein the input metadata specifies at least one luminance mapping function,
wherein the luminance mapping function specifies a relationship between luminances in the input image and a second image,
wherein the second image has at least 6 times higher or lower maximum luminance than a maximum luminance of the input image;
a graphics generation circuit, wherein the graphics generation circuit is arranged to generate a secondary image;
an image composition circuit, wherein the image composition circuit is arranged to compose an output image on the basis of pixel colors of the input image and of the secondary image; and
a luminance function selection circuit, wherein the luminance function selection circuit is arranged to selectively output to a metadata output a selected one of: a first type of output metadata representing the at least one luminance mapping function, in case no secondary image colors are mixed with the input image, and a second type of output metadata representing a predetermined luminance mapping function for the output image, in case the output image is not identical to the input image because some pixel colors of the secondary image have been used to change the input image colors.

2. The image processing apparatus of claim 1 wherein the predetermined luminance mapping function has a shape, wherein the shape is predetermined to give acceptable visual results regardless of the maximum luminance of the display.

3. The image processing apparatus of claim 1 wherein the predetermined luminance mapping function has a shape, wherein the shape depends on a maximum luminance of the display.

4. The image processing apparatus of claim 1,
wherein the image processing apparatus communicates in the output metadata an indicator,
wherein the indicator is a flag or a function type number,
wherein the indicator indicates that the predetermined luminance mapping function is to be used by the display when the display is connected and receives the output image, and wherein the predetermined luminance mapping function converts the output image to a display image of a different luminance dynamic range than the output image.

5. A device, comprising:
an image input, wherein the image input is configured to receive an image signal from an image processing apparatus, wherein the image signal comprises a succession of pixellized images; and
a dynamic metadata analyzer, wherein the dynamic metadata analyzer is configured to receive metadata from the image processing apparatus, wherein the metadata includes a selected one of a first type of metadata and a second type of metadata, wherein the first type of metadata represents at least one time-varying luminance mapping function, and wherein the second type of metadata represents a predetermined luminance mapping function, and wherein the dynamic metadata analyzer is configured to determine from the metadata whether the metadata includes the first type of metadata or includes the second type of metadata.

6. A method of providing an image signal, wherein the image signal drives a display, the method comprising:
an image processing apparatus receiving an input image and input metadata,
wherein the input metadata specifies at least one luminance mapping function,
wherein the luminance mapping function specifies a relationship between luminances in the input image and a second image,
wherein the second image has at least 6 times higher or lower maximum luminance than a maximum luminance of the input image;
the image processing apparatus generating a secondary image;
the image processing apparatus composing an output image on the basis of pixel colors of the input image and of the secondary image; and
the image processing apparatus selectively outputting to a metadata output a selected one of: first output metadata representing the at least one luminance mapping function, in case no secondary image colors are mixed with the input image, and second output metadata representing a predetermined luminance mapping function, in case the output image is not identical to the input image because some pixel colors of the secondary image have been used to change the input image colors.

7. The device of claim 5,
wherein the device identifies via an indicator that the predetermined luminance mapping function is present in the metadata, wherein the indicator is included in the metadata,
wherein the predetermined luminance mapping function is used to convert the output image into a display image.

8. The device of claim 5, wherein the device is configured such that when the metadata includes the first type of metadata, the device applies the time-varying luminance mapping function to the succession of pixellized images to produce display images for display, and when the metadata includes the second type of metadata, the device applies the predetermined luminance mapping function to the succession of pixellized images to produce the display images for display.

9. The device of claim 7, wherein the indicator is a flag or a function type number.

10. A method, comprising:
receiving an image signal from an image processing apparatus, wherein the image signal comprises a succession of pixellized images and at least one luminance mapping function per image, wherein the pixellized images comprise pixels, wherein the pixels have colors, and wherein the colors have luminances;
receiving metadata from the image processing apparatus, wherein the metadata includes a selected one of a first type of metadata and a second type of metadata, wherein the first type of metadata represents at least one time-varying luminance mapping function, and wherein the second type of metadata represents a predetermined luminance mapping function; and
determining from the metadata whether the metadata includes the first type metadata or includes the second type of metadata.

11. The method of claim 10, further comprising:
when the metadata includes the first type of metadata, applying the time-varying luminance mapping function to the succession of pixellized images to produce display images for display; and
when the metadata includes the second type of metadata, applying the predetermined luminance mapping function to the succession of pixellized images to produce the display images for display.

12. The method of claim 10, wherein the metadata includes an indicator which indicates whether the metadata includes the first type of metadata or includes the second type of metadata.

13. The method of claim 12, wherein the indicator is a flag or a function type number.

* * * * *